United States Patent [19]

Auer

[11] 4,158,261
[45] Jun. 19, 1979

[54] GYRO COMPASS AND DIRECTIONAL GYRO ARRANGEMENT

[75] Inventor: Werner Auer, Weisenbach, Fed. Rep. of Germany

[73] Assignee: Teldix GmbH, Heidelberg, Fed. Rep. of Germany

[21] Appl. No.: 922,301

[22] Filed: Jul. 6, 1978

[30] Foreign Application Priority Data

Jul. 7, 1977 [DE] Fed. Rep. of Germany ....... 2730616

[51] Int. Cl.² ........................................... G01K 19/384
[52] U.S. Cl. ....................................... 33/324; 33/318; 74/5 R
[58] Field of Search ................. 33/324, 318, 322, 325, 33/326, 327, 328; 74/5 R, 5.9

[56] References Cited

U.S. PATENT DOCUMENTS

| | | | |
|---|---|---|---|
| 2,968,956 | 1/1961 | Agins | 33/324 |
| 3,049,808 | 8/1962 | Miner et al. | 33/326 |
| 3,231,984 | 2/1966 | Howe et al. | 33/324 |
| 3,263,506 | 8/1966 | Kawada | 33/324 |
| 3,394,596 | 7/1968 | Wende et al. | 33/323 |
| 3,813,788 | 6/1974 | Johnson | 33/321 |

*Primary Examiner*—Richard E. Aegerter
*Assistant Examiner*—John W. Shepperd
*Attorney, Agent, or Firm*—Spencer & Kaye

[57] ABSTRACT

In a gyro arranged to be mounted in a vehicle and operable selectively as a directional gyro or as a gyro compass, which gyro includes a gyro rotor rotatable about a horizontal spin axis, an inner gimbal supporting the gyro rotor via its spin axis and pivotal about an axis which is maintained vertical when the gyro is operating as a gyro compass, a second gimbal supporting the inner gimbal via its axis and pivotal about an axis normally parallel to the rotor spin axis, an outer gimbal supporting the second gimbal and pivotal about an axis oriented approximately parallel to the vertical axis of the vehicle when the vehicle is upright, and control units for maintaining the desired orientations between the various axes, there is provided an intermediate gimbal disposed between the second gimbal and the outer gimbal, supporting the second gimbal via its axis, and having a pivot axis which is supported by the outer gimbal and which extends orthogonally to the axes of the second and outer gimbals, the second and intermediate gimbals being so arranged that the axis of the inner gimbal is vertical when the gyro is operating as a gyro compass, and the control units include a vertically sensor associated with the intermediate gimbal and are arranged for maintaining the axis of the second gimbal horizontal and the axis of the inner gimbal parallel to the axis of the intermediate gimbal when the gyro is operating as a directional gyro.

10 Claims, 4 Drawing Figures

GYRO COMPASS AND DIRECTIONAL GYRO ARRANGEMENT

BACKGROUND OF THE INVENTION

The present invention relates to a north seeking gyro, or gyro compass, and course holding, or directional, gyro arrangement for a vehicle.

Arrangements of this type generally include (1) a gyro with a normally horizontal rotor axis and an inner gimbal supporting the gyro rotor and having an axis which is vertical in the north seeking mode, a deflection of the inner gimbal from a given position against a restraint being possible and a pickup being provided to generate a signal in dependence on such deflection;

(2) a second gimbal in which the inner gimbal is mounted and which has a pivot axis that extends parallel to the rotor axis when the latter is in its undeflected position;

(3) an outer gimbal in which the second gimbal is mounted and which is mounted to pivot about an axis which is approximately parallel to the normally vertical upright axis of the vehicle;

(4) a follow-up device for the outer gimbal which, based on the signal from the pickup disposed between the inner gimbal and the second gimbal, causes the outer gimbal to follow the inner gimbal and is provided with a drive to selectively pivot the second gimbal about its axis either into the position where the axis of the inner gimbal is in a vertical position, when the gyro is to operate as a gyro compass, or into another position where the axis is essentially inclined to the vertical, when the gyro is to operate as a directional gyro.

Such a gyro is disclosed in German Patent No. 1,265,998 and counterpart U.S. Pat. No. 3,394,596. In the operation of the gyro described therein, it is assumed that the axis of the outer gimbal is vertical, and the axis of a second intermediate gimbal is then also vertical when in the north seeking mode and the rotor axis and the tilt axis of a first intermediate gimbal are horizontal. In order to make possible such vertical alignment of the axis of the outer gimbal it is proposed in that patent to use a gyro stabilized platform, which makes the device more expensive.

In the known gyro arrangement, the second intermediate gimbal, when its axis is in the vertical position—i.e. in the north seeking mode—is deflected with respect to the first intermediate gimbal by the north driving moment and, with the aid of the thus obtained pickup voltage, the outer gimbal is rotated until there no longer is a deflection, i.e. the rotor axis has been aligned with the north direction. Then the first intermediate gimbal is tilted by 90° about the second axis of rotation so that the gyro becomes a directional gyro.

Due to the necessity of employing an expensive device to keep the gyro in vertical alignment, this known gyro arrangement, although actually advantageous, has not been able to find acceptance. At present the custom is still to use two separate gyros which are separately cardanically suspended. When the vehicle is in a position other than one in which its upright direction is vertical, the north seeking gyro will seek north correctly but this north value is transferred to the directional gyro with a cardanic error.

SUMMARY OF THE INVENTION

It is an object of the present invention to modify the known gyro arrangement in a relatively simple manner to enable it to be used even if the vehicle no longer has its upright direction vertical so as to be able to employ the gyro for the dual function of north seeking and directional gyro over a broad range.

This and other objects are achieved, according to the invention, by further providing a gyro of the above-described type with an intermediate gimbal disposed between the second gimbal and the outer gimbal, supporting the second gimbal via its axis, and having a pivot axis which is supported by the outer gimbal and which extends orthogonally to the axes of the second gimbal and the outer gimbal, the second gimbal and intermediate gimbal being so arranged that the axis of the inner gimbal is vertical when the gyro is operating as a gyro compass, and control means including a verticality sensor associated with the intermediate gimbal and arranged for maintaining the axis of the second gimbal horizontal when the gyro is operating as a directional gyro, and by arranging the drive for placing the axis of the inner gimbal parallel to the axis of the intermediate gimbal when the gyro is operating as a directional gyro.

In contradistinction to the known arrangement, embodiments of the present invention include an additional intermediate gimbal which, together with the second gimbal, forms a cardanic suspension for the gyro when it is in the north seeking mode. The vertical suspension of the inner gimbal can be provided by designing the entire second gimbal with all its parts as a pendulum when in the north seeking mode or by providing the axes of the second gimbal and the intermediate gimbal each with an associated control circuit including a verticality sensor, amplifier and drive, e.g. torquer, so that the control circuit associated with the axis of the intermediate gimbal keeps the axis of the second gimbal horizontal and the control circuit associated with the axis of the second gimbal keeps the second gimbal and thus the axis of the inner gimbal vertical. Verticality sensors that can be used are, for example, pendulum devices and leveling bubbles, as well as accelerometers.

In the course-holding mode, the second gimbal is pivoted about its axis into the plane of the intermediate gimbal, a pivot signal preferably being coupled into the control circuit associated with that axis and the second gimbal is thus pivoted until it reaches an abutment. In this position, the second gimbal is rigidly connected with the intermediate gimbal and the control circuit associated with the spin axis of the second gimbal is inoperative. However, the "follow-up circuit," including the pickup and the follow-up device, continues to operate, possibly with an other amplification, and in this position produces a support for the center of the gimbal which is necessary for this operation.

The present invention is based on the consideration that the north value produced during the north seeking mode is—when read out—also be affected by a cardanic error if the upright direction of the vehicle is not vertical, but this error will not be transferred to the directional gyro due to the double utilization of the gyro. The north value in the course holding mode also contains—when read out—a cardanic error when the upright direction of the vehicle is not vertical. Since the vehicle moves horizontally on the average, such error will be averaged out when the north value is utilized to determine the vehicle location.

Compared to a dual gyro version, the present invention results in substantial reductions in cost and improvements in accuracy, added to which are the following advantages:

A space-saving structure. The gyro for north seeking is switched on also during directional mode and its deviation from north being only slight. During the north seeking mode the device can be adapted to the movements of the vehicle;

A significant reduction in costs is effected, compared to prior art structure with dual utilization of the gyro element and with separate means for vertical placement.

The present invention, moreover, provides a cardanic suspension without requiring the large number of gimbals, e.g. five, that would be required if the arrangement of U.S. Pat. No. 3,394,596 were modified to provide such a suspension. Instead, the invention requires only one added gimbal and uses one gimbal that is present for other reasons to contribute to the cardanic suspension.

A gyro according to the present invention can be further provided with additional improvements. Thus, it may be appropriate to associate a moment generator with the inner gimbal and to feed the alternating component of the pickup signal to this moment generator via an electronic system for purposes of damping. The alternating component of the pickup signal can also, if the control device for the intermediate gimbal has a torquer as its drive element, be additionally fed to this torquer so as to attenuate oscillations of the intermediate gimbal about its axis.

The direct current component of the pickup signal serves to provide follow-up for the outer gimbal. The torquer input exhibits differentiating behavior.

As already mentioned, when changing to the course mode, the second gimbal may be moved against an abutment. If, however, for calibration reasons the gimbal is to be pivotal by 180°, the use of such an abutment is not possible. Then the center of the gimbal can be supported by disposing a pickup which is active in the course holding mode between the intermediate gimbal and the second gimbal so that the output signal of the pickup is zero when the axis of the inner gimbal lies in the plane of the intermediate gimbal, i.e. the axis of the inner gimbal lies parallel to the axis of the intermediate gimbal. This signal is then fed to the torquer which acts on the axis of the second gimbal so that this gimbal is held in the plane of the intermediate gimbal.

An improvement in the derived north value in the north seeking mode can be provided by measuring the north value in two positions of the inner gimbal and of the second gimbal which are rotated by 180° with respect to one another. In order to determine the vertical alignment of the axis of the inner gimbal, two verticality sensors may be provided, e.g. of the pendulum, or leveling bubble type, of which one is in operation in one of the positions. Instead of these two verticality sensors, there can also be provided an accelerometer which can perform its function in both positions.

In the arrangement according to the invention, the known drifts of the gyro can be compensated in a known manner by a torquer current or by computer.

It has been mentioned above that when the vehicle carrying the gyro has its upright direction nonvertical, a reading error may be produced by the cardanic error. This error can be calculated and compensated by measuring the nonvertical position in two planes.

DESCRIPTION OF THE PREFERRED EMBODIMENTS

Figure 1:
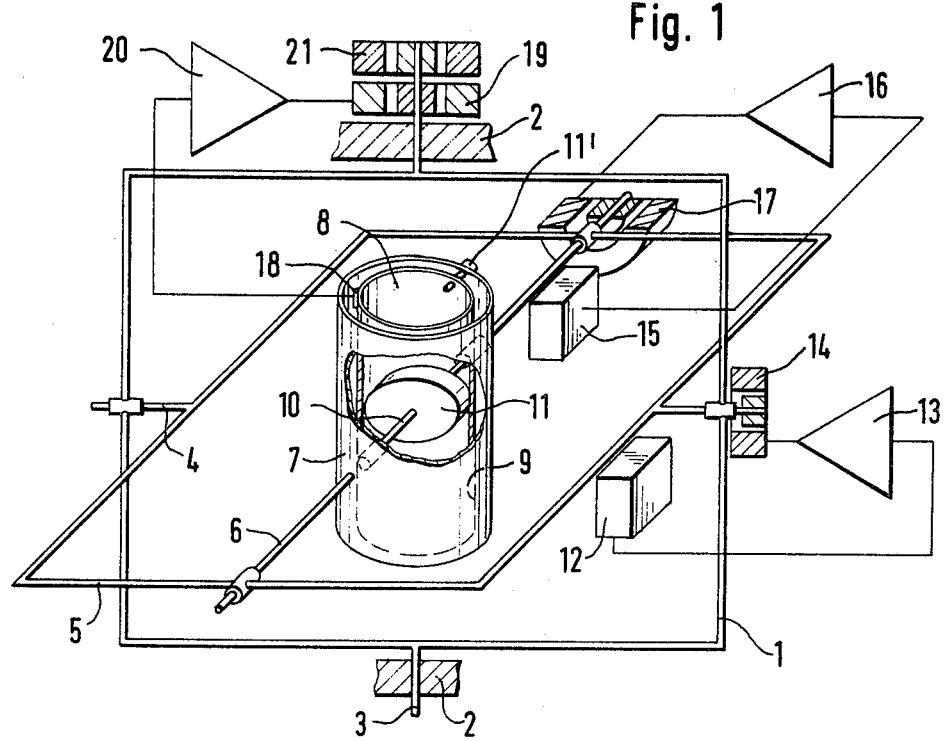
FIG. 1 is a partly simplified perspective, partly circuit schematic view of a preferred embodiment of the gyro arrangement according to the invention operating in the north seeking mode.
Figure 2:
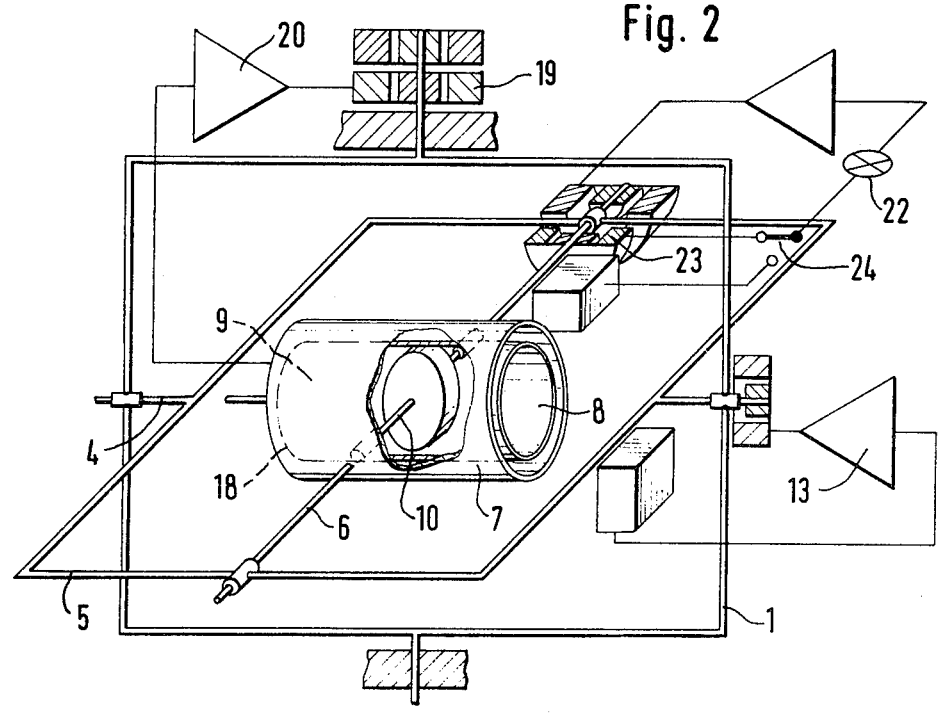
FIG. 2 is a view similar to that of FIG. 1 showing the embodiment of FIG. 1 in the course holding mode.

The gyro arrangement shown in FIGS. 1 and 2 includes an outer gimbal 1 rotatably supported by the vehicle, only the stationary bearing members 2 of the vehicle being shown. Most favorably, the axis 3 of the outer gimbal is arranged to be parallel to the upright axis of the vehicle so that it is vertical when the vehicle has a level, or horizontal, orientation.

In the outer gimbal 1 a first intermediate gimbal 5 is rotatably mounted with its axis 4 perpendicular to the axis 3 of the outer gimbal. In this intermediate gimbal 5 a further gimbal 7 is rotatably mounted again with its axis 6 perpendicular to the axis 4 of the intermediate gimbal 5.

This further gimbal 7 as a whole may be of similar construction as the intermediate gimbal 3 of German Pat. No. 1,265,998 and U.S. Pat. No. 3,394,596, i.e. it may be composed of a gyro having an inner gimbal 9 with a vertical axis of rotation 8 supported by gimbal 7. Gimbal 9 may be restrained by a spring 11' with respect to the intermediate gimbal 7 and is provided with a gyro rotor 11 whose spin axis 10, when in the rest position in which spring restraint 11' is relaxed, is parallel to the axis 6 of the intermediate gimbal 5. Spring arrangement 11' can be similar to that disclosed in the above-cited patent. The bearing supporting the inner gimbal 9 may again be a gas bearing or some other low friction bearing.

The gimbals 5 and 7 have associated with them verticality control circuits comprising, respectively, the verticality sensor 12, the amplifier 13 and the torquer 14, or verticality sensor 15, amplifier 16 and torquer 17, respectively. This causes the gimbals 5 and 7 to be adjusted so that the axis 6 of gimbal 7 is horizontal and the axis 8 of the inner gimbal is always vertical.

In this position, as long as the rotor axis 10 does not point in the north-south direction, the north driving moment deflects the inner gimbal 9 against the restraint 11', the deflection being noted by a pickup 18 acting between gimbals 7 and 9.

The output signal from pickup 18 acts via amplifier 20 on an adjustment drive 19, which may also be a torquer, attached to the vehicle and thus adjusts the gimbal 1 until the rotor shaft 10 points in the north-south direction. The alignment of the vehicle with respect to the newly found north direction can be determined at a pickup 21 which is effective between vehicle 2 and gimbal 1. It should be mentioned that the restraint 11' may be of various types. For example it may be constructed such as in FIG. 2 of U.S. Pat. No. 3,394,596 or such as in FIG. 4 of U.S. Pat. No. 3,518,771 or formed as an electrical restraint consisting of pickup, amplifier and torquer. The pickups 18 and 21 may be and may operate similar to the pickups 157 and 161 in FIG. 5 of the U.S. Pat. No. 3,394,596.

The emitted value from pickup 21 is free of cardanic error when the axis 3 of gimbal 1 is vertical, but has a cardanic error when the vehicle upright direction, i.e. axis 3, is nonvertical during this north seeking procedure.

Switching to the course holding mode is effected, as shown in FIG. 2, by altering the connections between sensor 15, amplifier 16 and torquer 17 as shown and by delivering to input 22 a pulse for rotating axis 6 of gimbal 7 so that gimbal 7 is tilted into the plane of the intermediate gimbal 5 and axes 4 and 8 coincide. By switching from verticality sensor 15 to the signal from pickup 23 (not shown in FIG. 1) acting on axis 6, by means of switch 24, this parallel alignment of axes 4 and 8 is maintained in the course holding mode and the pickup 23 produces its zero indication when this parallel position has been reached. The signal of pickup 23 is able also to tilt gimbal 7 into its course holding position. The pulse on input 22, when course holding mode is effected, is necessary to pivot the gimbal 7 in the direction of rotation of the rotor 11.

The verticality sensor 12 and the associated follow-up components 13 and 14 keep axis 6 horizontal in this course holding mode as well, and the follow-up circuit 18 to 20 is used, according to the invention, as a support for the center of the gimbals. Upon changing from the north seeking mode to the course holding mode, no cardanic error is transferred to the directional gyro even if the axis 3 of gimbal 1 is nonvertical. Upon righting of the vehicle during the subsequent start, the direction indicated at pickup 21 will then be without cardanic error.

In order to obtain course values of sufficient accuracy it is only necessary to select the gyro arrangement within gimbal 7 to have the appropriate accuracy and to select correspondingly accurate verticality sensors.

Figure 3:
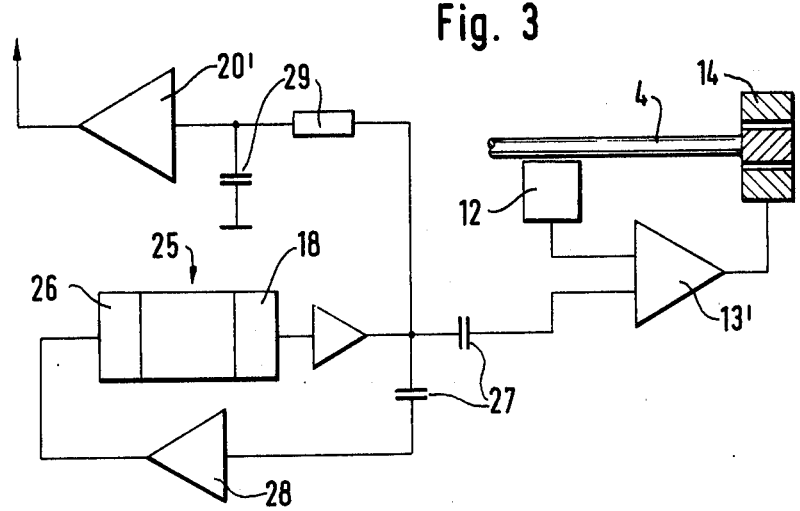
FIG. 3 is a circuit diagram of a modified version of a portion of the arrangement of FIGS. 1 and 2.

According to the modification shown in FIG. 3, in which block 25 represents the components 7 to 11' of FIG. 1, pickup 18 is represented by a box, and there is a torquer 26 acting on gimbal 9 via its axis 8, the signal from the pickup 18 is fed to the amplifier 20', corresponding to amplifier 20, for adjusting the outer gimbal 1, and the alternating components of the signal from pickup 18, passed by capacitors 27, are fed via amplifiers 28 and 13', respectively, to torquers 26 or 14, respectively, and thus produce damping or vibration suppression. The follow-up circuit containing amplifier 20' includes a lowpass filter 29 to assure that only direct current components of the signal from pickup 18 are effective.

Figure 4:
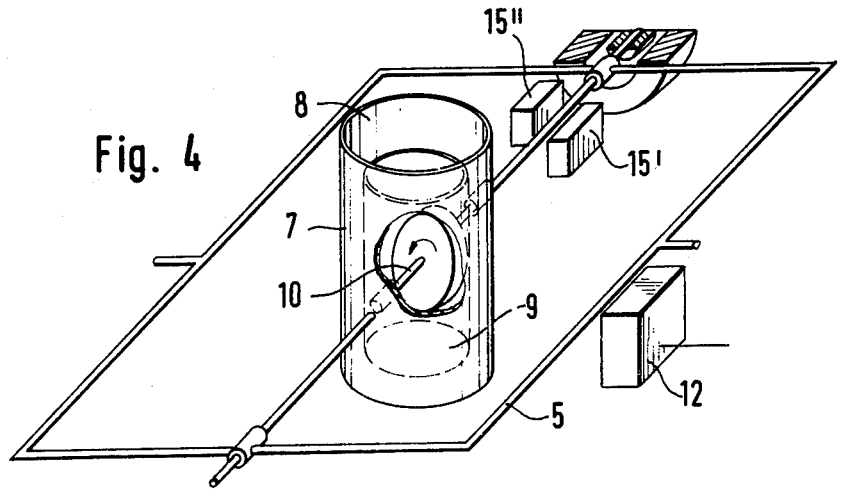
FIG. 4 is a perspective view of a portion of a modified version of the arrangement of FIGS. 1 and 2.

FIG. 4 shows only the intermediate gimbal 5 and the gyro components 7-11. In addition to verticality sensor 12 two verticality sensors 15' and 15" are provided in place of the single sensor 15 to monitor the vertical alignment of axis 8. In the illustrated position of gimbal 7, verticality sensor 15' takes over monitoring of the vertical position of axis 8, while when gimbal 7 is pivoted about axis 6 by 180° from the illustrated position, which is done to improve the north value indication accuracy, by averaging of the two north value indications, the verticality sensor 15" does the monitoring and sensor 15' is then not in operation. These two verticality sensors could be replaced by an acceleration sensor. Pivoting by about 90°, from the position shown in FIG. 1 to that of FIG. 2, and by 180°, for calibration purposes, is effected each time in the direction of rotation of the gyro rotor 11. This is necessary because of gyro reasons.

After the gyro of FIG. 1 has found north in one position it is pivoted by 180° (for calibration purposes) and then a second north value is found. The average of both values is an improved north value. The pivoting by 180° is done by switching the second verticality sensor 15" instead of 15' to the amplifier 16 and torquer 17 and by feeding to torquer 17 a pulse to insure pivoting in the direction of the gyro rotor rotation (similar to 22 of FIG. 2). Thereupon the gimbal 7 is pivoted by about 90°. If an abutment is used to determine the course holding position, a signal is fed to torquer 17 via amplifier 16 to reach this abutment in the correct direction (input 22). In case of the arrangement of FIG. 2, where a pickup 23 is provided switching to this pickup and feeding of a pulse is necessary to pivot and maintain the gimbal 7 into its and in its correct directional gyro mode position. The torquer 17 of FIG. 2 is used to pivot gimbal 7 by about 90° and eventually also by about 180° and to maintain the gimbal 7 in its correct directional gyro position. There may be provided a separate control torquer and a separate drive.

It will be understood that the above description of the present invention is susceptible to various modifications, changes and adaptations, and the same are intended to be comprehended within the meaning and range of equivalents of the appended claims.

What is claimed is:

1. In a gyro arranged to be mounted in a vehicle and operable selectively as a directional gyro or as a gyro compass, which gyro includes:

a gyro rotor rotatable about a horizontal spin axis;

an inner gimbal supporting the gyro rotor via its spin axis and pivotal about an axis which is maintained vertical when the gyro is operating as a gyro compass;

means defining a yieldable restraint tending to maintain the inner gimbal in a selected position and opposing pivoting of the inner gimbal about its axis away from the selected position;

a first position sensor disposed for providing a signal in dependence on such pivoting of the inner gimbal;

a second gimbal supporting the inner gimbal via its axis and pivotal about an axis parallel to the rotor spin axis when the inner gimbal is in its selected position;

an outer gimbal supporting the second gimbal and pivotal about an axis oriented approximately parallel to the vertical axis of the vehicle when the vehicle is upright;

follow-up means connected between the position sensor and the outer gimbal axis for pivoting the outer gimbal about its axis in response to pivoting of the inner gimbal relative to the second gimbal; and drive means selectively connected for placing the second gimbal into a position where the axis of the inner gimbal is vertical when the gyro is to operate as a gyro compass, and for placing the second gimbal into a position where the axis of the inner gimbal is substantially inclined to the vertical when the gyro is to operate as a directional gyro, the improvement wherein said gyro further comprises: an intermediate gimbal disposed between said second gimbal and said outer gimbal, supporting said second gimbal via its axis, and having a pivot axis which is supported by said outer gimbal and which extends orthogonally to the axes of said second gimbal and said outer gimbal, said second gimbal and intermediate gimbal being so arranged that the axis of said inner gimbal is vertical when said gyro is operating as a gyro compass; and control means includng a verticality sensor associated with said intermediate gimbal and arranged for maintaining the axis of said second gimbal horizontal when said gyro is operating as a directional gyro, and wherein said drive means are arranged for placing the axis of said inner gimbal parallel to the axis of said intermediate gimbal when said gyro is operating as a directional gyro.

2. An arrangement as defined in claim 1 wherein second control means comprising a second verticality sensor are disposed for monitoring the orientation of said second gimbal about its axis, and said second control means cooperate with said first control means for maintaining the axis of said inner gimbal vertical when said gyro is operating as a gyro compass.

3. An arrangement as defined in claim 1 wherein said second gimbal, said inner gimbal and said rotor are so arranged that when said gyro is operating as a gyro compass, said second gimbal is aligned vertically due to the pendulum effect.

4. An arrangement as defined in claim 1 further comprising a moment generator connected to receive the alternating component of the signal from said first position sensor and connected to supply a vibration damping force to said inner gimbal.

5. An arrangement as defined in claim 1 wherein said control means further comprise: a torquer connected for controlling pivoting of said intermediate gimbal about its axis relative to said outer gimbal; and means supplying the alternating component of the output signal from said first position sensor for attenuating oscillatory movements of said intermediate gimbal about its axis.

6. An arrangement as defined in claim 1 wherein said follow-up means are arranged for pivoting said outer gimbal as a function of the time derivative of the output signal from said position sensor.

7. An arrangement as defined in claim 1 wherein said second control means comprise a second position sensor disposed for providing a signal in dependence on the pivoting of said second gimbal relative to said intermediate gimbal, which signal has a value of zero when said second gimbal is oriented so that the axis of said inner gimbal is parallel to the axis of said intermediate gimbal, said second position sensor being selectively operatively connected to said control means when said gyro is to operate as a directional gyro, for causing said control means to maintain the axis of said inner gimbal parallel to the axis of said intermediate gimbal.

8. An arrangement as defined in claim 1 wherein, for operation as a gyro compass, said second gimbal is arranged to be pivoted about its axis to a position 180° away from an initial position for calibration purposes, and drive means comprise sensing means for determining the vertical alignment of the axis of said inner gimbal for both positions of said second gimbal.

9. An arrangement as defined in claim 8 wherein said sensing means comprise two verticality sensors each operative in a respective one of the two positions of said second gimbal.

10. An arrangement as defined in claim 8 wherein said sensing means comprise an accleration sensor operative in both of the positions of said second gimbal.

* * * * *